United States Patent [19]

Thrower

[11] 4,047,598
[45] Sept. 13, 1977

[54] CALIPER BRAKE TORQUE PLATE
[75] Inventor: Arthur J. Thrower, Troy, Ohio
[73] Assignee: The B. F. Goodrich Company, Akron, Ohio
[21] Appl. No.: 722,982
[22] Filed: Sept. 13, 1976
[51] Int. Cl.² .............................................. F16D 65/00
[52] U.S. Cl. .................................. 188/71.1; D12/180; 188/205 R
[58] Field of Search ................. 188/71.1, 72.4, 72.5, 188/73.3, 73.4, 205 R, 206 R; D12/180

[56] References Cited

U.S. PATENT DOCUMENTS

| | | | |
|---|---|---|---|
| 2,988,176 | 6/1961 | DuBois | 188/72.5 X |
| 3,134,459 | 5/1964 | Barnett et al. | 188/73.3 X |
| 3,158,230 | 11/1964 | Chouings | 188/72.4 |
| 3,199,632 | 8/1965 | Chouings | 188/73.4 |
| 3,949,839 | 4/1976 | Girauldon | 188/71.1 X |

FOREIGN PATENT DOCUMENTS

| | | | |
|---|---|---|---|
| 1,269,737 | 7/1961 | France | 188/73.3 |
| 1,506,592 | 11/1967 | France | 188/73.4 |
| 1,510,612 | 12/1967 | France | 188/73.3 |
| 976,649 | 12/1964 | United Kingdom | 188/73.4 |

*Primary Examiner*—George E. A. Halvosa
*Attorney, Agent, or Firm*—W. A. Shira, Jr.; F. K. Lacher

[57] ABSTRACT

A torque plate in the form of a sheet metal disc having a central opening for positioning of the torque plate around a shaft and a peripheral flange on the outer edge of the disc with spaced-apart supporting surfaces for mounting a slider support on which the caliper and friction lining carriers are slidably mounted. The torque plate may have a mounting surface around the opening and a second surface offset from the mounting surface at intermediate positions between the opening and flange.

6 Claims, 10 Drawing Figures

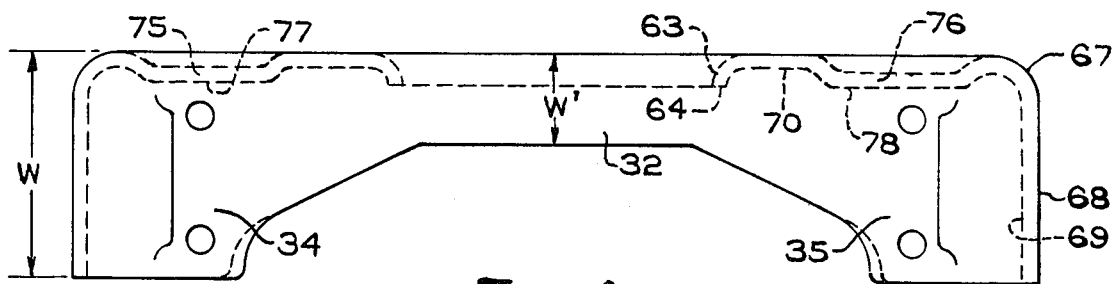
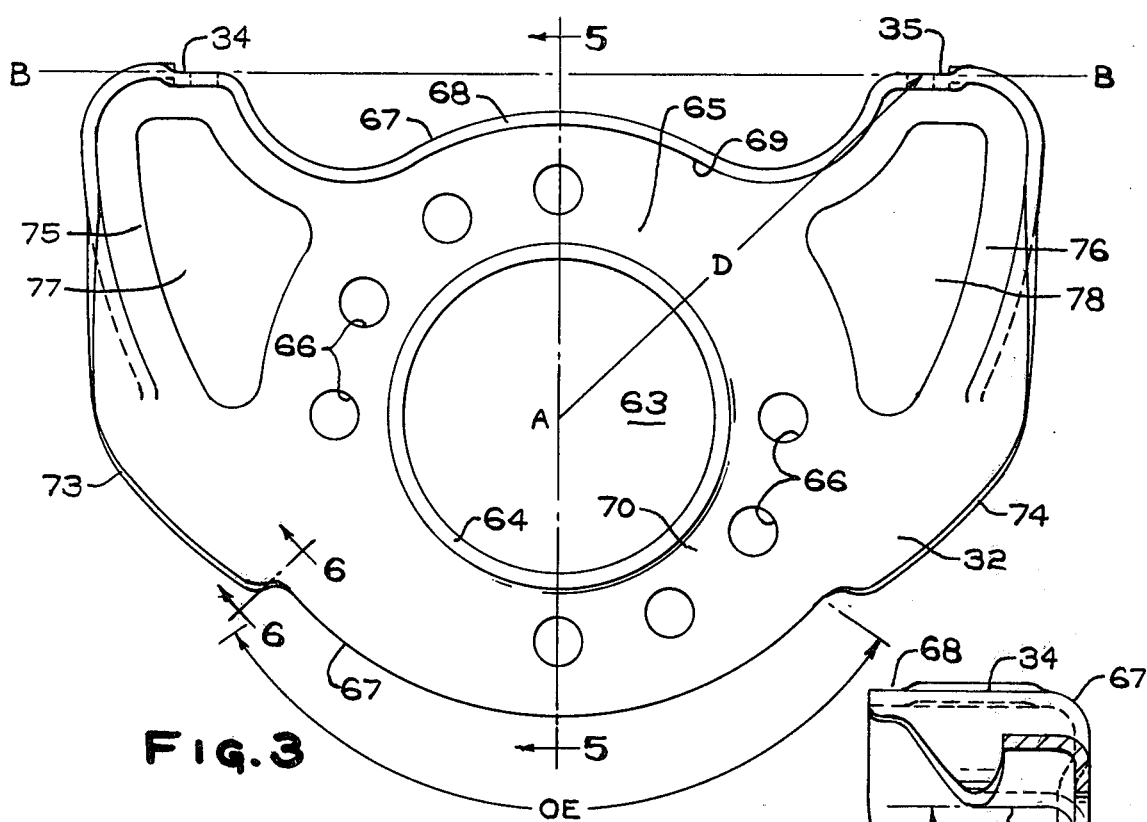
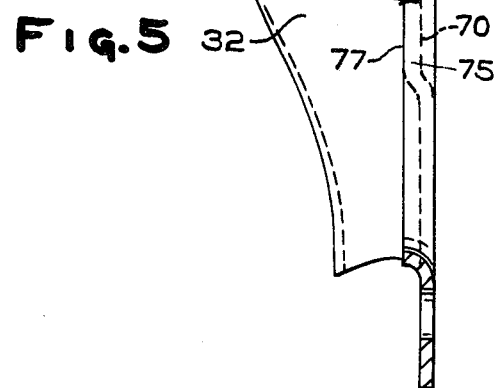
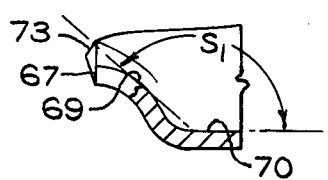

CALIPER BRAKE TORQUE PLATE

BACKGROUND OF THE INVENTION

Heretofore torque plates of heavy guage steel have been used with floating caliper brakes. These heavy forgings of around 1¼ inch plate steel have added undesirable weight and have required considerable machining before they could be used in the brake. The extra thickness was required to provide the necessary resistance to torsional forces generated during the braking. Provisions also had to be made for the control of brake retarding forces and the distribution of these forces. The torque plate did not have a long register for the slider support bracket and the thickness limited the clearance between the support bracket and the adapter/wheel mounting bolts as well as the radial clearance between the caliper and valve stem. The thickness of the torque plate also made it necessary to provide extra clearance between the torque plate/knuckle mounting bolts and the hub. These problems were encountered with both single and dual caliper brakes.

SUMMARY OF THE INVENTION

The present invention provides a torque plate construction which is lightweight and at the same time has the necessary strength to transmit forces and resist distortion. Making the plate of lightweight steel as by stamping in the special configuration of this invention results in a plate having relatively wide peripheral flanges on which the support bracket can be mounted with a long positive register. The thin construction also provides for maximum clearance between the support bracket and adapter/wheel mounting bolts, between the torque plate, knuckle mounting and hub and between the caliper and valve stem.

BRIEF DESCRIPTION OF THE DRAWINGS

FIG. 3 is an elevational view like FIG. 2 of the torque plate of this invention.

FIG. 4 is a plan view of the torque plate shown in FIG. 3.

FIG. 5 is a sectional view taken along the plane of line 5—5 in FIG. 4.

FIG. 6 is an enlarged fragmentary detailed sectional view taken along the plane of line 6—6 in FIG. 3.

DETAILED DESCRIPTION

Figure 1:
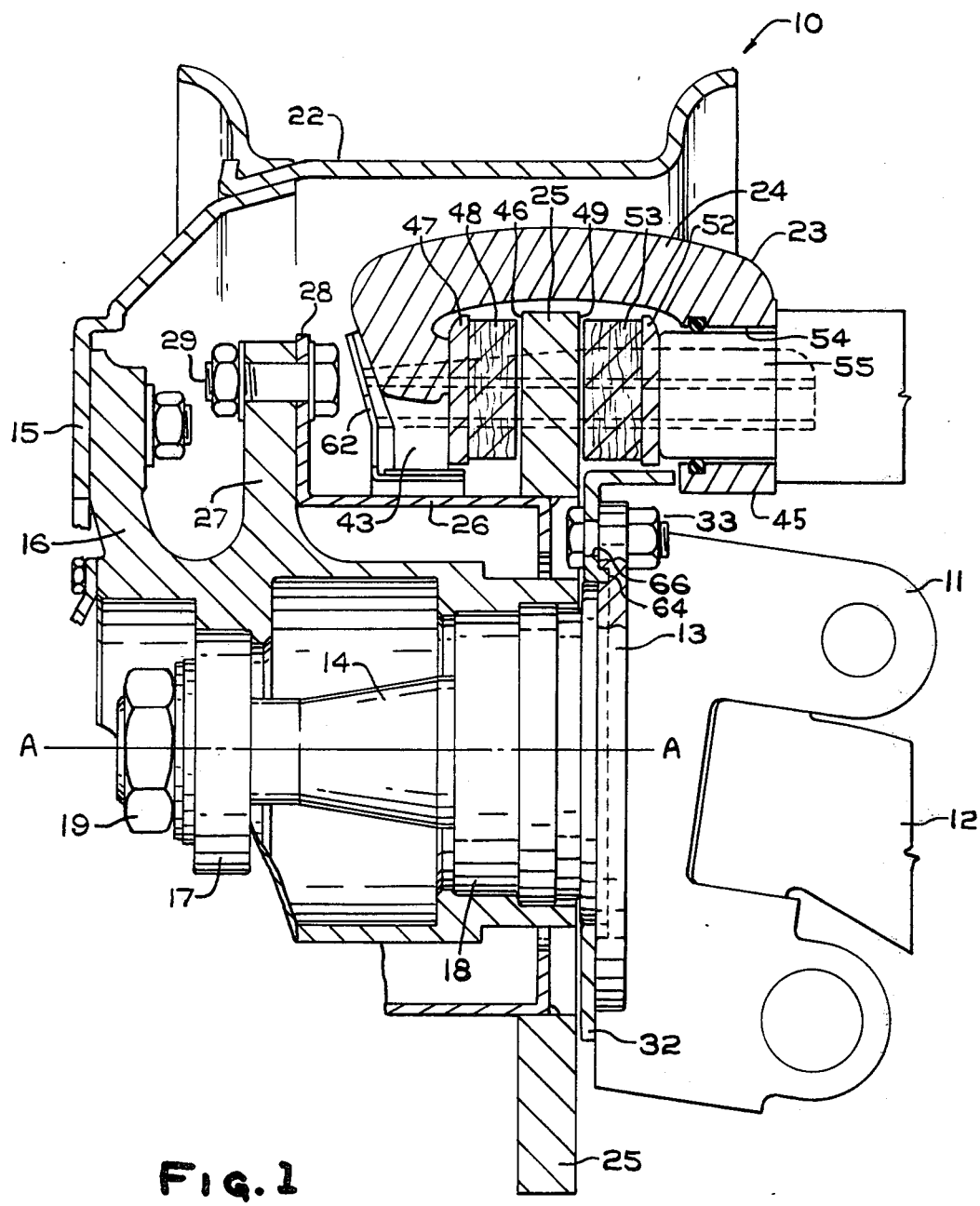
FIG. 1 is a fragmentary side elevation with the caliper disc brake and wheel assembly in section mounted on a front axle of a vehicle taken along the plane of line 1—1 in FIG. 2 and with the brake rotated 45 degrees clockwise.
Figure 2:
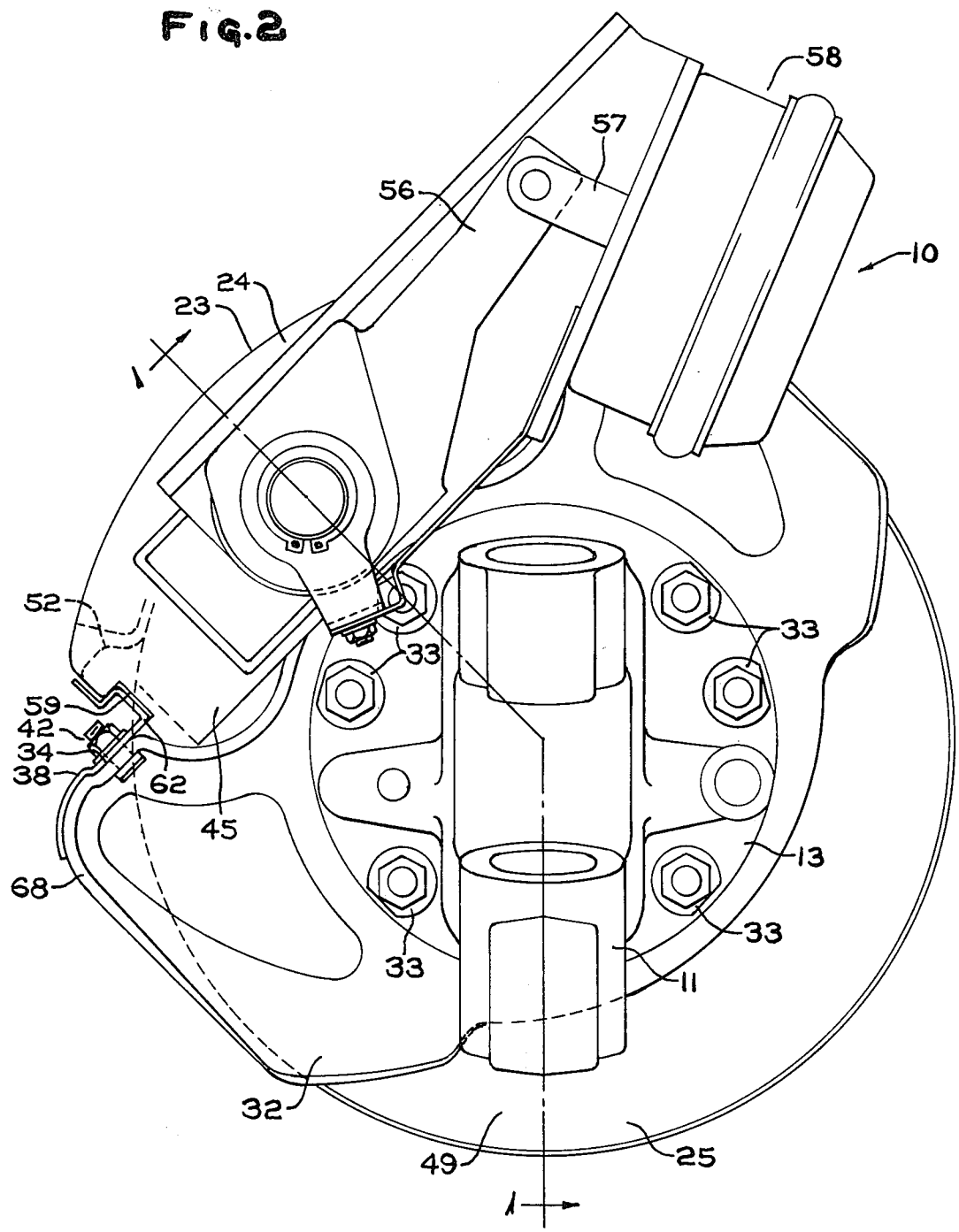
FIG. 2 is an elevation of the inboard end of the brake assembly shown in FIG. 1.

Referring to FIGS. 1 and 2, a wheel and axle assembly 10 for a front end of a vehicle is shown. A clevis bracket 11 is pivotally mounted on a front axle 12 and fastened to a circular plate 13 which is integral with a stub shaft 14 having an axis A—A. A wheel 15 having a hub 16 is rotatably mounted on the stub shaft 14 through suitable bearings 17 and 18 and retained on the stub shaft by a nut 19 threaded on the end of the shaft. The wheel 15 may have a rim 22 for supporting a tire (not shown).

A caliper brake 23 is mounted in the wheel well envelope within the wheel 15 and includes a caliper member 24 extending axially of the stub shaft 14 over a brake disc 25 which is mounted as by welding on a cylindrical disc adapter 26. The hub 16 has a radially extending hub flange 27 to which an adapter flange 28 of the disc adapter 26 is fastened as by bolt and nut assemblies 29 positioned at circumferentially spaced-apart locations around the hub flange and adapter flange. A torque plate 32, shown also in FIGS. 3, 4 and 5, is bolted to the circular plate 13 by bolt and nut assemblies 33 at circumferentially spaced-apart positions around the circular plate. The torque plate 32 has a pair of supporting surfaces 34 and 35 for carrying rail members 38 which are bolted to the supporting surfaces by nut and bolt assemblies 42.

At the outboard end of the caliper member 24, a radially extending member such as a rear leg 43 extends radially inward in overlapping relationship with the brake disc 25. At the inboard end of the caliper member 24, a radially extending member such as front leg 45 extends radially inward in overlapping relationship with the brake disc 25. Interposed between an outboard face 46 of the disc 25 and the rear leg 43 is a friction lining carrier 47 carrying a friction lining 48 for engagement with the outboard face of the disc. Interposed between an inboard face 49 of the disc 25 and the front leg 45 is a friction lining carrier 52 carrying a friction lining 53 for engagement with the inboard face of the disc.

The front leg 45 of the caliper member 24 includes a cylindrical opening 54 in which a brake actuating mechanism 55 may be mounted. The mechanism 55 may include an actuating screw and threaded sleeve connected to a shaft with an arm 56 pivotally connected to a piston rod 57 of a pneumatic piston and cylinder assembly 58 as shown in FIG. 2.

The front leg 45 and rear leg 43 of the caliper member 24 have axially extending grooves 59 at the sides for sliding engagement with the rail members 38 of a U-shaped slider support member 62. Likewise, the friction lining carriers 47 and 52 have axially extending grooves at the edges for sliding engagement with the rail members 38. Accordingly, upon actuation of the brake by movement of the arm 56 in a counterclockwise direction as shown in FIG. 2, the friction lining carrier 52 and friction lining 53 are moved to the left as shown in FIG. 1 into braking engagement with the inboard face 49 of the disc 25.

At the same time the force exerted on the front leg 45 is transmitted through the beam of the caliper member 24 to the rear leg 43. The force from the rear leg 43 is transmitted to the lining carrier 47 urging the friction lining 48 into engagement with the outboard face 46 of the disc 25. This movement of the caliper member 24 is to the right as shown in FIG. 1 away from the hub flange 27. In a similar manner, the caliper member 24 moves away from the hub flange 27 as the friction linings 48 and 53 wear and adjustmentt is made for this wear.

Referring now to FIGS. 3, 4, and 5, the torque plate 32 is shown in greater detail. The torque plate 32 is a generally disc shaped welded or stamped body of steel having a thickness of around ¼ inch. A central opening 63 is provided for the stub shaft 14 and may have a rolled-in flange 64. An annular mounting portion 65 around the central opening 63 has a plurality of bolt holes 66 at spaced-apart positions on a bolt circle for receiving the bolts of bolt and nut assemblies 33 which clamp the torque plate 32 to the circular plate 13 of the stub shaft 14.

The torque plate 32 has a radially outer edge 67 with a peripheral outer flange 68 on which the supporting surfaces 34 and 35 are located in substantially the same plane B—B as shown in FIG. 3 for mounting of the rail members 38 of the U-shaped slider support member 62. The outer flange 68 which may be deep drawn has a flange surface 69 which is generally perpendicular to a mounting portion surface 70 as shown by angle S in FIG. 5.

As shown in FIG. 4, the width W of the flange 68 is around twelve times the thickness of torque plate 32 and is greater than one-third the distance D from the axis centerline A—A, shown in FIG. 3, to one of the supporting surfaces 34 or 35 to provide a substantially long register for seating the slider support member 62. The width $W_1$ of the outer flange 68 is less at the portion of the torque plate positioned at the edge of the mounting portion surface 70 and between the supporting surfaces 34 and 35 as shown in FIG. 4.

The outer flange 68 is discontinued at the outer edge 67 which is on the opposite side of the torque plate 32 from the supporting surfaces 34 and 35 at the edge portion indicated by letters OE in FIG. 3. The width W of the outer flange 68 also decreases as the distance between the supporting surfaces 34 and 35 and the opposite edge portion OE increases providing tapered edges 73 and 74 as shown in FIGS. 3 and 5. The tapered edges 73 and 74 are also flared outwardly in a direction radially of the torque plate 32 from a position where the flange surface 69 is generally perpendicular to the mounting portion surface 70 as shown in FIG. 5 to a position where the flange surface 69 is at an angle $S_1$ to the mounting portion surface 70 of approximately 140°.

As shown in FIGS. 3, 4, and 5, the torque plate 32 has raised portions 75 and 76 interposed between the bolt circle and outer flange 68. The raised portions 75 and 76 are spaced radially outward from the mounting portion 65 and radially inward from the ouer flange 68 and may have raised surfaces 77 and 78 parallel to and spaced from the mounting portion surface 70 for reinforcing the torque plate 32 adjacent the supporting surfaces 34 and 35.

With this construction, the torque plate 32 provides a long positive register at each of the supporting surfaces 34 and 35 for mounting of the U-shaped slider support member 62. The outer flange 68 is combination with the mounting portion 65 and the raised portions 75 and 76 have a configuration which is especially adapted for transmitting torque and other braking forces between the slider support member 62 and the circular plate 13 of the stub shaft 14 without distortion.

The thin walls of the torque plate 32 not only reduce the weight of the wheel and axle assembly 10 but also make possible maximum clearance between the slider support member 62 and the bolt and nut assemblies 29 fastening the adapter flange 28 to the hub flange 27. Maximum clearance is also provided between the bolt and nut assemblies 33 fastening the torque plate 32 to the circular plate 13 and the hub 16. In addition, this construction maximizes the radial clearance between the caliper member 24 and the rim 22 where space is needed for the valve stem (not shown).

Figure 10:
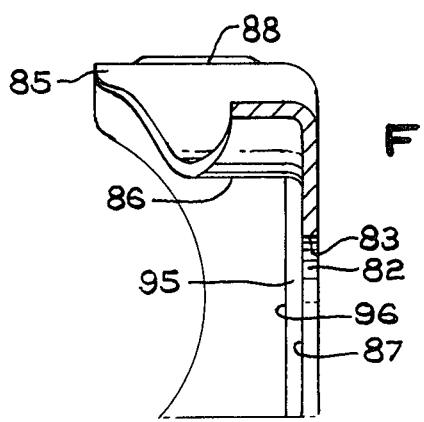
FIG. 10 is a sectional view taken along the plane of line 10—10 in FIG. 7.

Referring to FIGS. 7 through 10, a modification of this invention is shown in the form of a torque plate 79 for a dual caliper brake. The torque plate 79 is a generally disc-shaped body of sheet steel having a thickness of approximately ¼ inch and may be stamped or welded in the configuration shown in the drawings. A central opening 82 is provided for a stub shaft or other nonrotatable member of a vehicle and has an edge 85 which may be welded to the nonrotatable member. Radially outward of the opening 82 is an annular mounting portion 84 and radially outward of the mountting portion is a peripheral outer flange 85. The outer flange 85 may be deep drawn and has a flange surface 86 which is generally perpendicular to a mounting surface 87 extending from the mounting portion 84 to the outer flange 85 as shown in FIG. 10.

Figure 7:
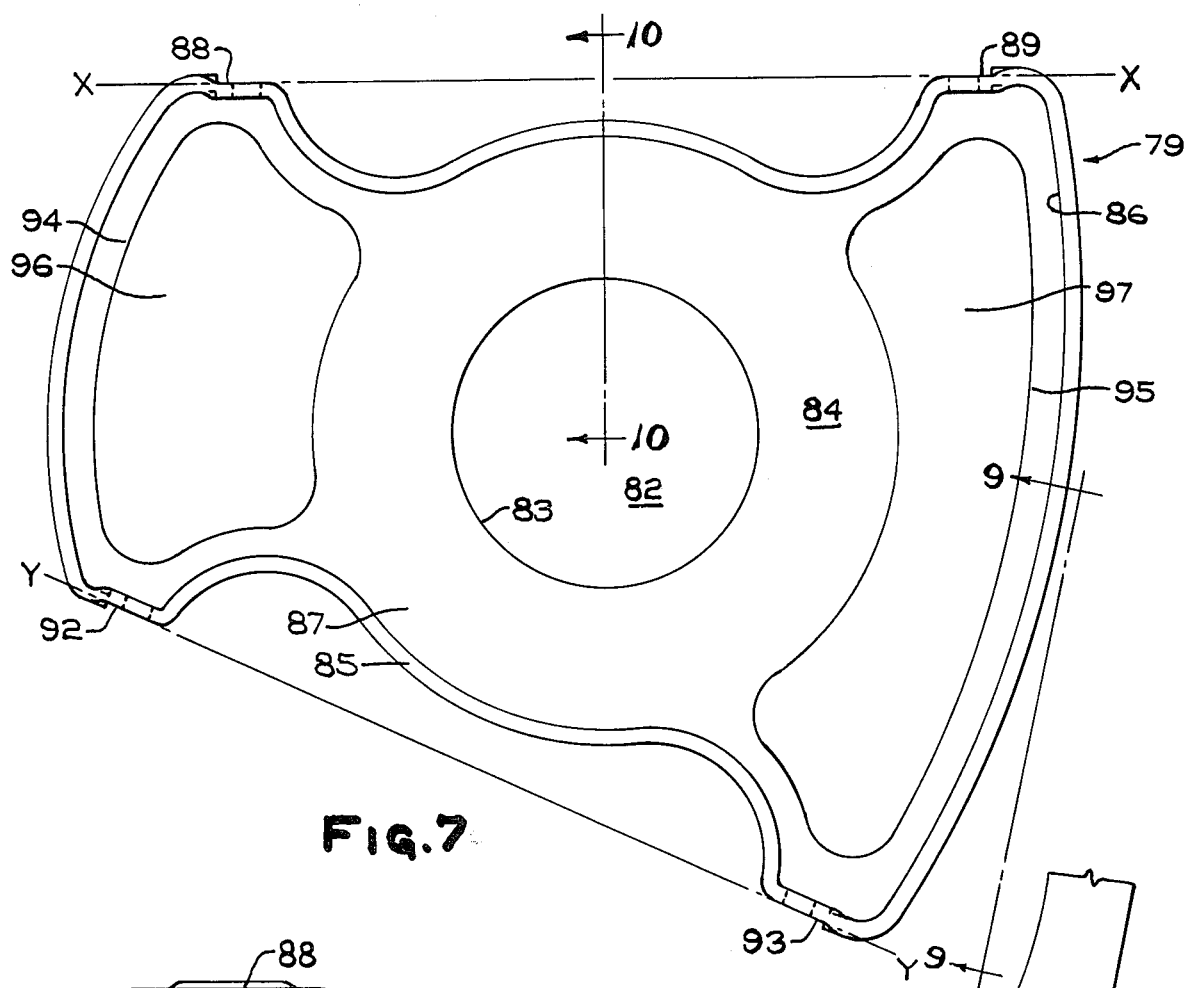
FIG. 7 is an elevational view of a torque plate embodying the invention for a dual caliper brake.

The torque plate 79 has a first pair of supporting surfaces 88 and 89 at spaced-apart positions and in substantially the same plane X—X shown in FIG. 7. The supporting surfaces 88 and 89 are on the outer flange 85 and provide a relatively long register for mounting of a U-shaped slider support member of a caliper brake (not shown).

On the other side of the torque plate 79, a second pair of supporting surfaces 92 and 93 are located on the outer flange 85 at spaced-apart positions and in substantially the same plane Y—Y as shown in FIG. 7. The supporting surfaces 92 and 93 are substantially long to provide a long register for receiving a second U-shaped slider support member of a dual caliper brake. The plane X—X of supportingg surfaces 88 and 89 may be in converging relationship with the plane Y—Y of supporting surfaces 92 and 93 as shown in FIG. 7 to conform with the dual caliper brake or the planes may be parallel. In the embodiment shown, the distance between the supporting surface 88 and supporting surface 92 is less than the distance between the supporting surface 89 and supporting surface 93.

Figure 8:
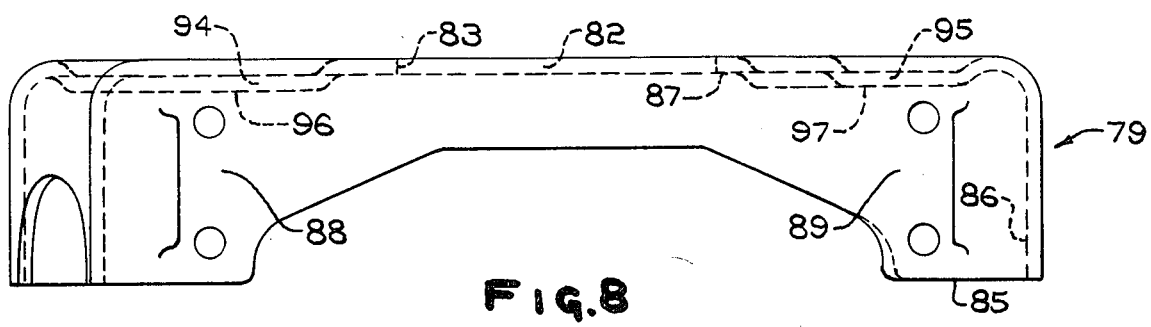
FIG. 8 is a plan view of the torque plate of FIG. 7.
Figure 9:
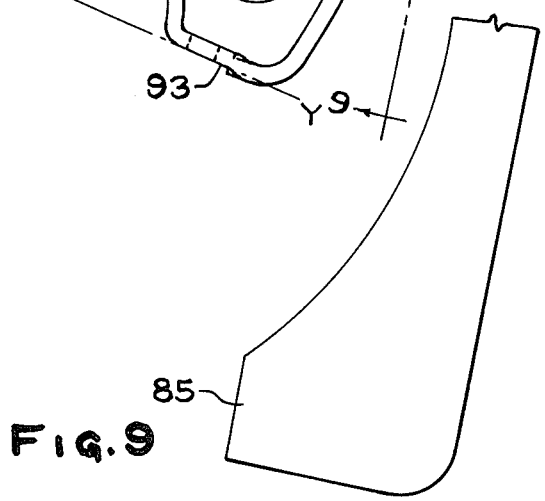
FIG. 9 is a fragmentary side view taken along the plane of line 9—9 in FIG. 7.

The outer flange 85 has a maximum width at the supporting surfaces 88, 89, 92 and 93 and is reduced in width between the surfaces as shown in FIGS. 8 and 9. Raised portions 94 and 95 are located between the mounting portion 84 of the torque plate 79 and the outer flange 85 adjacent the supporting surfaces 88, 89, 92 and 93 to reinforce the torque plate. The raised portions 94 and 95 may have raised surfaces 96 and 97 which are spaced from and substantially parallel to the mounting surface 87.

With this construction, a dual caliper brake may utilize a lightweight torque plate 79 while at the same time transmit the braking forces and torque between the supporting surfaces 88, 89, 92 and 93 and the nonrotatable supporting member of the vehicle on which the torque plate is mounted. Because of the minimum thickness of the walls of the torque plate 79, maximum clearance is also possible and less space is needed for accommodating the brake.

The invention is capable of other modifications and adaptions by those having ordinary skill in the art and is more particularly defined by the appended claims.

I claim:

1. A torque plate for a caliper brake comprising a generally disc-shaped body having a central opening for positioning of said plate around a shaft, a mounting portion extending continuously around said opening having a first surface, a peripheral flange at an outer edge of said body having a peripheral flange surface, said flange extending along at least a portion of said outer edge and being positioned with said flange surface generally perpendicular to said first surface, said flange surface including a pair of spaced-apart rail supporting surfaces on said flange spaced from said mounting portion for mounting supporting brake members on which the caliper and friction lining carriers of said brake are slidably supported, said peripheral flange being positioned at the edge of said mounting portion at a position between said rail supporting surfaces and being continuous therebetween along said edge with said peripheral flange having a substantial width in a direction perpendicular to said first surface at said rail supporting surfaces to provide a long register for the brake supporting rails and a reduced width at said position between said rail supporting surfaces, and second surfaces raised from said first surfaces of said body at positions outward of said mounting portion in the proximity of said rail supporting surfaces.

2. A torque plate according to claim 1 wherein said body has a central flange around said opening.

3. A torque plate according to claim 1 wherein said peripheral flange has a width at said supporting surfaces greater than one-third the distance from the axis of said shaft to one of said supporting surfaces.

4. A torque plate according to claim 3 wherein said body is of sheet steel.

5. A torque plate according to claim 4 wherein said body has a thickness of around ¼ inch.

6. A torque plate according to claim 3 wherein said peripheral flange has a width at said supporting surfaces around twelve times the thickness of said torque plate.

* * * * *